May 30, 1939.  W. L. SCRIBNER  2,160,420
DOUBLE ROW ROLLER BEARING
Filed Aug. 11, 1938
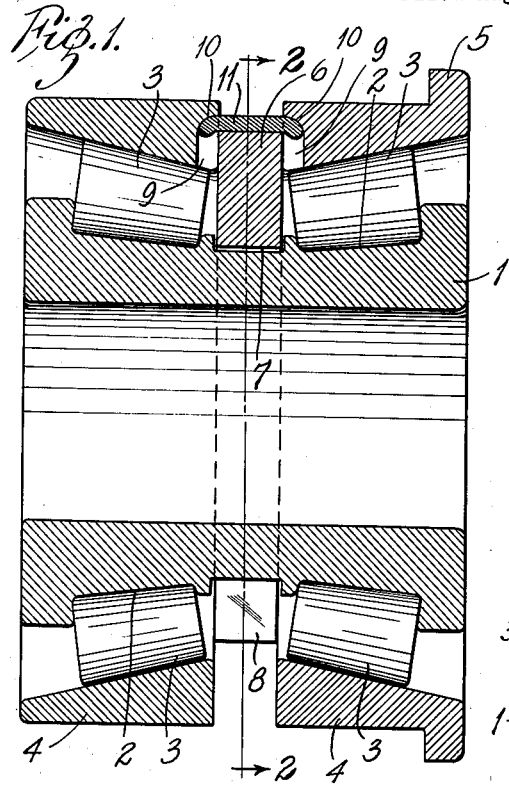
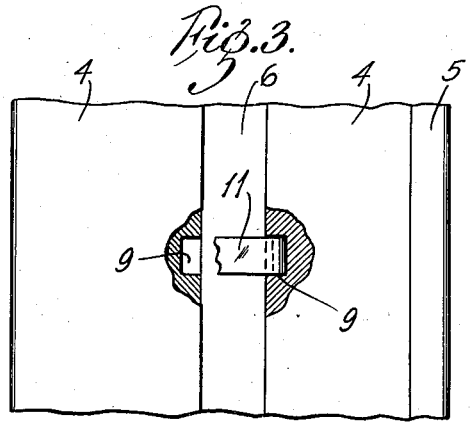
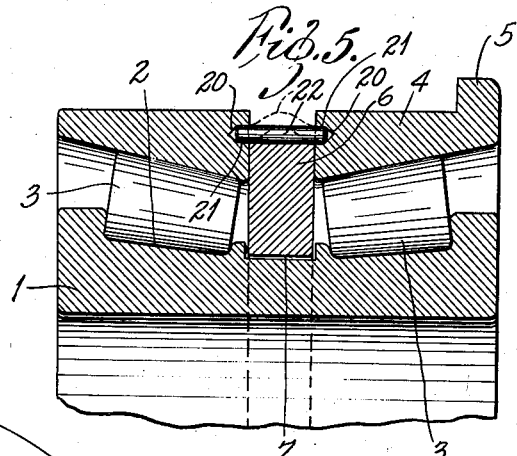
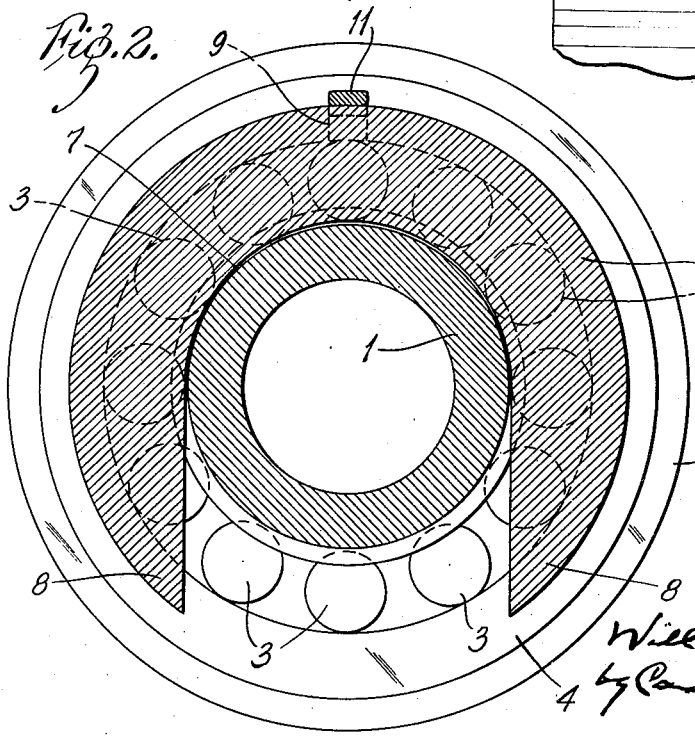

Patented May 30, 1939

2,160,420

UNITED STATES PATENT OFFICE 2,160,420

DOUBLE ROW ROLLER BEARING

William L. Scribner, Canton, Ohio, assignor to The Timken Roller Bearing Company, Canton, Ohio, a corporation of Ohio Application August 11, 1938, Serial No. 224,242

5 Claims. (Cl. 308—214)

My invention relates to roller bearings of the type having two series of rollers and separate cups or outer bearing members therefor, means being provided between said outer bearing members for holding them in proper spaced running position. The invention has for its principal object a bearing of this type which is easy to assemble, in which the outer bearing members are accurately positioned and in which accidental displacement of the spacing device is prevented.

The invention consists in the double row roller bearing and in the parts and combinations and arrangements of parts hereinafter described and claimed.

In the accompanying drawing, wherein like symbols refer to like parts wherever they accur, Fig. 1 is a longitudinal sectional view of a double row roller bearing embodying my invention;

Fig. 2 is a cross-sectional view on the line 2—2 in Fig. 1;

Fig. 3 is a partial elevation, showing the retaining member for the spacer;

Fig. 4 is a perspective view of the retaining member before assembly; and

Fig. 5 is a longitudinal sectional view of a modification, the dotted lines indicating the retaining pin before assembly.

The drawing illustrates a bearing comprising a double inner bearing member or cone 1 having conical raceways 2 thereon that taper toward the middle of the bearing, two series of taper bearing rollers 3 and a separate outer bearing member or cup 4 for each series of rollers, one of said cups being shown as provided with a peripheral flange 5 for abutment against the face or shoulder of a suitable mounting member, as a rocker arm. The present invention is concerned with the means for holding the bearing cups in proper spaced running position.

An open-ended or C-shaped washer 6 of a thickness necessary to space the bearing cups 4 the proper distance apart is mounted between the opposed end faces of said cups. Said washer 6 has a semi-circular opening 7 of such diameter that it fits loosely over the middle portion of the bearing cone and the inner margins of the jaws or arms 8 of said washer extend tangentially from the ends of said semi-circular opening so that the washer may be slipped freely over the cone 1.

The end face of each cup 4 has a slot 9 milled therein which ends outwardly beyond the outer periphery of said washer. The end portion 10 of the bottom of each slot is curved so as to form a reaction surface and anchoring means for a retaining member 11, which is illustrated as being a strip of soft steel, preferably flat wire.

Said retaining piece 11 is originally a flat wire or strip of curved shape as shown in Fig. 4 and its ends are slipped into the milled slots, after which the strip may be forced into the position shown in Fig. 1, the middle portion resting against the spacing washer and the ends projecting into the slots 9.

In the modified construction shown in Fig. 5, the ends of said cups 4 have openings 20 therein to receive the ends 21 of a pin 22, which is originally of angular shape, as shown in dotted lines, and which is forced into straight position with its ends extending into said openings.

Both forms of the invention hold the cups in proper position and cause them to rotate together. The bearing is easily assembled and accidental displacement of the spacing washer is prevented.

Obviously numerous changes may be made without departing from the invention and I do not wish to be limited to the precise construction shown and described.

What I claim is:

1. A double row roller bearing comprising two annular series of rollers, a separate bearing cup for each series of rollers, said cups being disposed with their opposed ends spaced apart, each of said opposed ends having a slot therein stopping short of the outer periphery of the cup, an open-ended spacing washer interposed between said cups and a retaining piece extending across said spacing washer with its ends extending into said slots.

2. A double row roller bearing comprising two annular series of rollers, a separate bearing cup for each series of rollers, said cups being disposed with their opposed ends spaced apart, each of said opposed ends having a slot therein stopping short of the outer periphery of the cup, said slot having a curved bottom, an open-ended spacing washer interposed between said cups and a retaining piece extending across said spacing washer with its ends extending into said slots.

3. A double row roller bearing comprising two annular series of rollers, a separate bearing cup for each series of rollers, said cups being disposed with their opposed ends spaced apart, each of said opposed ends having an opening therein inwardly of the outer periphery of the cup, an open-ended spacing washer interposed between said cups and a retaining piece extending across said spacing washer with its ends extending into said openings.

4. A double row roller bearing comprising two annular series of rollers, a separate bearing cup for each series of rollers, said cups being disposed with their opposed ends spaced apart, an open-ended spacing washer interposed between said cups, each of said opposed ends of said cups having a slot therein stopping short of the outer periphery of the cup but extending beyond the outer periphery of said spacing washer, said slot having a curved bottom, and a retaining piece extending across said spacing washer with its ends extending into said slots.

5. A double row roller bearing comprising two annular series of rollers, a separate bearing cup for each series of rollers, said cups being disposed with their opposed ends spaced apart, an open-ended spacing washer interposed between said cups, each of said opposed ends of said cups having a recess therein outwardly of said spacing washer, and a retaining pin extending across said spacing washer with its ends extending into said openings.

WILLIAM L. SCRIBNER.